United States Patent Office 3,745,194
Patented July 10, 1973

3,745,194
OXIDATIVE DEHYDROGENATION OF
PARAFFINIC HYDROCARBONS
Brent J. Bertus, Floyd Farha, Jr., and Harlin D. Johnston, Bartlesville, Okla., assignors to Phillips Petroleum Company
No Drawing. Filed Oct. 16, 1970, Ser. No. 81,599
Int. Cl. C07c 5/18
U.S. Cl. 260—680 E
12 Claims

ABSTRACT OF THE DISCLOSURE

Organic compounds are dehydrogenated to compounds having a higher degree of unsaturation by contacting the feedstock in the vapor phase in the presence of an oxygen-containing gas with a catalyst containing tin in an oxidized state in combination with at least one of the metals bismuth, cobalt, or nickel in an oxidized state. Representative of such conversions is the oxidative dehydrogenation of butane to 1,3-butadiene over a nickel stannate-containing catalyst. The conversion products are valuable compounds particularly useful as intermediates for the preparation of polymeric materials such as synthetic rubbers and the like.

---

The present invention relates to chemical compositions. More particularly, the invention relates to catalyst compositions, their preparation and to catalytic processes employing such compositions, e.g., processes for effecting the dehydrogenation of hydrocarbons.

As a general rule, the unsaturated hydrocarbons have a greater economic value than saturated or paraffinic hydrocarbons. For example, butenes are more valuable than butanes and butadiene is more valuable than either. Presently, diolefins such as 1,3-butadiene and isoprene are in high demand, particularly for conversion to polymeric materials for use in the rubber industry. The unsaturated hydrocarbons are generally produced by hydrocarbon conversion methods, with the dehydrogenation of more saturated feedstocks being a widely used method of synthesizing such materials. While noncatalytic thermal dehydrogenation processes are known, such processes are generally not economically desirable for preparing olefins and diolefins because of low conversion and yields to desired products, extensive undesirable side reactions which take place in such processes, and the large capital requirements for equipment capable of handling temperature requirements and the large volumes of materials which must necessarily be handled.

As a consequence, a large number of catalytic processes have been developed for the dehydrogenation of organic feedstocks to more unsaturated materials. Thus, there are known catalytic processes for the dehydrogenation of paraffinic feedstocks in the absence of oxygen, in the presence of oxygen, and in the presence of hydrogen. Processes are also known for the dehydrogenation of olefins such as butenes to diolefinic materials such as the butadienes in the absence of oxygen, in the presence of oxygen and in the presence of hydrogen. At least certain of these processes have been found quite effective in converting paraffinic hydrocarbons to monoolefinic unsaturated materials and monounsaturated hydrocarbons such as monoolefins to the diolefinic material. The direct conversion of saturated hydrocarbons to substantial amounts of diolefins, though highly desirable, is very elusive because such direct conversions generally result in low per pass conversions or low selectivities or both.

It has now been discovered that saturated paraffins such as butane can be directly converted in one step to diolefinic materials with sufficient per pass conversions and selectivities which, when combined with other advantages, provide a process which can be economically attractive. One of these advantages is the nature of the byproducts formed. A substantial portion of the products other than the valuable monoolefins or diolefins consists of other olefinic materials which are more valuable than the starting feed and which can be considered valuable salable products. These additional byproducts appear to be obtained by a cracking operation because they have fewer carbon atoms per molecule than the starting feed hydrocarbon. Specifically, the cracking side reaction produces a substantial amount of lower molecular olefinic products with only small amounts of carbon monoxide and carbon dioxide or other typical cracking products such as coke and heavy aromatic compounds which are of relatively little value and which frequently cause difficulties in separation operations.

The present invention provides a novel catalyst and a novel process for the conversion of hydrocarbon feedstocks to hydrocarbons having a greater degree of unsaturation and which have the same or lower number of carbon atoms as in the hydrocarbon feed. According to this invention, hydrocarbon feedstock can be converted directly to hydrocarbons having a greater degree of unsaturation by contacting said feedstock under dehydrogenation conditions in the vapor phase in the presence of molecular oxygen with a catalytic material comprising tin in an oxidized state in association with at least one of the metals bismuth, cobalt or nickel in an oxidized state. Thus, paraffinic hydrocarbons can be converted in good yields diolefins and/or monoolefins and monoolefins can be converted to diolefins. The invention is particularly applicable for the production of diolefins from paraffins and particularly useful results are obtained by the dehydrogenation of butane to 1,3-butadiene.

The hydrocarbon feedstocks which are applicable for the oxidative dehydrogenation processes of the present invention comprise dehydrogenatable aliphatic hydrocarbons having from about 4 to about 10 carbon atoms per molecule and at least one

grouping. These can be branched or unbranched and include paraffins as well as monoolefins, but paraffins are presently preferred. The conversion of butane has been found particularly advantageous by the process of the invention. Some specific examples of other feeds include isobutane, pentane, methylbutanes, hexane, 2-methylhexane, octane, 2,4-dimethyloctane, butene-2, 2-methylbutene-1, hexene-2, octene-1, 3-methylnonene-4, and the like, and mixtures of such compounds.

The novel catalysts of the present invention comprise tin associated with at least one of bismuth, cobalt or nickel. These elements are not in the elemental state but are combined with sufficient oxygen to form one or more neutral compounds, for example, bismuth stannate. The molar proportions of tin to the bismuth, cobalt or nickel are in the range of from about 3:1 to about 1:3, preferably from about 2:1 to about 1:2, in the catalyst. Optionally, but preferably, the above catalyst is further associated with a catalytic support material. The presently preferred support material is a catalytic grade silica, alumina, or silica-alumina. The support material, when used, will comprise about 10 to about 90, preferably from about 30 to about 60, weight percent of the total catalyst composition.

The above-described catalytic composition can still further, optionally, be associated with a catalyst-modifying quantity of a Group IA or a Group IIA metal. When present, the alkali or alkaline earth metal will be present in the catalytic composition in the range of from about 0.1 to about 10 weight percent, based upon the weight of the above-described catalyst composition.

Still further, the catalyst can comprise, if desired, a modifying amount of antimony and/or arsenic. These materials will generally be present in the catalyst, when utilized, in amounts ranging from about 0.1 to about 10 weight percent, based upon the weight of the above-described catalyst composition.

The catalysts of the present invention can be prepared by any suitable method. Conventional methods such as coprecipitation, impregnation, or dry-mixing can be used. In general, any method can be used which will provide a composition containing the above-described elements in the above-described proportions and which will have a catalytic surface area of at least 1 square meter/gram.

Thus, a tin compound and at least one compound of bismuth, cobalt, or nickel are combined in any suitable way. Substantially any tin compound or any bismuth, cobalt or nickel compound can be employed in the catalyst composition so long as none of the compounds are deleterious to the final dehydrogenation catalyst and essentially all of the elements in the compounds used, other than the tin, bismuth, cobalt or nickel, are removed from the final catalyst by prior washing or by volatilization.

Suitable tin compounds include any such compound which is soluble or dispersible in water and can include both stannous or stannic compounds. Examples of such compounds include potassium stannate, stannic fluoride, stannous chloride, stannic bromide, stannous iodide, stannic sulfate, stannic acetate, stannic oxide, stannic tartrate, stannic nitrate, and the like and mixtures thereof.

Similarly, suitable bismuth, cobalt or nickel compounds can be used. These can include both organic or inorganic compounds. Some examples of these are nickel oxide, nickel acetylacetonate, bismuth bromide, cobalt nitrate, nickel nitrate, nickel acetate, bismuth oxychloride, cobalt chloride, nickel chloride, and the like and mixtures thereof.

Similarly, examples of catalyst-modifying materials comprising one or more alkali or alkaline earth metal compounds or arsenic or antimony compounds can include lithium nitrate, sodium carbonate, potassium chloride, rubidium acetate, cesium nitrate, magnesium bromide, calcium chloride, strontium tartrate, sodium arsenate, arsenic acid, antimony trioxide, antimony pentoxide, antimony chloride, triphenylarsine, and the like and mixtures thereof.

A convenient preparation is to coprecipitate suitable catalyst-forming compounds from aqueous solutions followed by conventional aging, washing, drying, calcining, pelletizing and the like. When a catalyst support is used, it can conveniently be introduced during the coprecipitation stage of catalyst preparation. Alternatively, a solid catalyst support, generally in the finished form of a pellet, sphere, or particle, can be impregnated with solutions of a tin compound and of a suitable bismuth, cobalt, or nickel compound. The impregnated solid can then be dried and calcined. When other catalyst-modifying agents are used, they can be introduced into the catalyst either before, during, or after the tin and the bismuth, cobalt or nickel compounds have been associated with the support.

Whichever catalyst preparation technique is used, the catalyst is activated prior to contact with the feed hydrocarbons by a calcination step. Thus, the finished catalyst is calcined in an oxygen-containing gas such as air at a temperature in the range of from about 900 to about 1500° F. for a time in the range of about 1 to about 24 hours, or until the catalyst is active for carrying out the oxidative dehydrogenation step.

The hydrocarbon feedstocks can be dehydrogenated according to the process and with the catalyst of the present invention at temperatures in the range of from about 800 to about 1200° F., preferably from about 950 to about 1100° F. at any convenient pressure such as from about 7 to about 250 p.s.i.a., and at a hydrocarbon: oxygen ratio of from about 1:0.5 to about 1:4. The presence of steam is frequently beneficial and a steam: hydrocarbon ratio up to about 20:1 can be used. The hydrocarbon feed rate will generally be in the range of about 50 to about 800 GHSV. The fixed catalyst bed is the preferred mode of contact but other modes, such as the fluidized bed, can also be used.

The dehydrogenation process of this invention is ordinarily carried out by forming a mixture, preferably preheated, of the hydrocarbon feed, the oxygen-containing gas, and the steam (when used) and passing this mixture over the catalyst at the selected temperature. The effluent from the reaction zone is subjected to any suitable separation method to isolate and recover the desired products. Unconverted feeds or partially converted materials can be recycled.

The invention can be illustrated by the following examples.

EXAMPLE I

Preparation of catalysts

Several tin-containing oxidative dehydrogenation catalysts were prepared in which the tin was associated with each of bismuth, nickel and cobalt. Each catalyst also contained 40 weight percent alumina (Alon-C, a finely divided, nonporous, flame-hydrolyzed alumina commercially available from Cabot Corporation).

The catalysts were prepared by mixing bismuth stannate, nickel stannate, or cobalt stannate with the alumina with just enough distilled water to make a slurry. Both the alumina and the metal stannates were in the powdered state. The slurry was dried at 300° F. and calcined at 1200° F. in air for about 16 hours. The resulting caked solid was then granulated to 8–20 mesh.

For purposes of comparison, a similar iron-containing catalyst was prepared from ferrous stannate.

EXAMPLE II

Oxidative dehydrogenation of butane

The above-described catalysts were charged into a fixed bed reactor and used in several runs in which butane was dehydrogenated in the presence of air and steam (in certain of the runs). The essential conditions and the results of these runs are shown in the following table.

TABLE I

| Run | Temp., °F. | Feed rates (GHSV) | | | Mols/100 mols of feed | | | |
|---|---|---|---|---|---|---|---|---|
| | | $C_4H_{10}$ | Air | Steam | Con. | Mod.[1] | $C_4H_8+C_4H_6$ | $C_2H_4+C_3H_6$ |
| (1) 60% bismuth stannate, 40% alumina | 1,050 | 18 | 550 | 0 | 34.3 | 89 | 19.2 | 14.0 |
| (2) 60% bismuth stannate, 40% alumina | 1,000 | 300 | 1,500 | 0 | 23.0 | 89 | 16.0 | 4.0 |
| (3) 60% bismuth stannate, 40% alumina | 1,000 | 100 | 300 | 0 | 34.0 | 91 | 22.0 | 9.0 |
| (4) 60% cobalt stannate, 40% alumina | 1,050 | 50 | 250 | 600 | 36.0 | 59.5 | 15.4 | 6.0 |
| (5) 60% nickel stannate, 40% alumina | 1,000 | 50 | 250 | 250 | 27.0 | 74 | 18.0 | 5.7 |
| (6) 60% ferrous stannate, 40% alumina | 1,050 | 100 | 500 | 0 | 25.9 | 46.7 | 8.7 | 3.4 |

[1] Modivity = A simplified selectivity based on gas phase products only. Here, it represents conversion to $C_4H_8$, $C_4H_6$ and $C_2H_4$ $C_3H_6$. (Conversions are based on a $C_4$ feed basis).

The data in the table show that the catalysts containing tin and bismuth, tin and nickel, and tin and cobalt show substantial activity for the conversion of butane to desirable dehydrogenated products such as butenes and butadiene, as well as to desirable cracked products such as ethylene and propylene. Butadiene was a significant amount of the $C_4$ products. For comparison, the comparable tin and iron-containing catalyst shows less conversion and/or selectivity in this reaction.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

What is claimed is:

1. A process for the dehydrogenation of a paraffinic hydrocarbon feedstock having 4 to 10 carbon atoms and at least one

grouping which comprises contacting said feedstock in the vapor phase under dehydrogenation conditions in the presence of molecular oxygen with a catalyst consisting essentially of tin in association with at least one of the metals bismuth, cobalt or nickel in combination with sufficient oxygen to form at least one neutral compound, said catalyst having been activated by calcining at elevated temperatures, and wherein the molar ratio of tin to bismuth, cobalt or nickel in said catalyst is in the range of 3:1 to 1:3.

2. A process according to claim 1 wherein said catalyst has incorporated therein from 0.1 to 10 weight percent, based upon weight of total composition, of a Group IA or Group IIA metal.

3. A process according to claim 1 wherein said catalyst has incorporated therein from 0.1 to 10 weight percent, based upon weight of total composition, of antimony or arsenic.

4. A process according to claim 2 wherein said feedstock comprises butane.

5. A process according to claim 1 wherein said catalyst is in combination with a catalytic carrier material selected from the group consisting of silica, alumina or silica-alumina.

6. A process according to claim 5 wherein said carrier material comprises from 10 to 90 weight percent of total catalyst composition.

7. A process according to claim 5 having incorporated therein from 0.1 to 10 weight percent, based on weight of total catalyst composition of a Group IA or Group IIA metal.

8. A process according to claim 5 wherein said catalyst has incorporated therein from 0.1 to 10 weight percent, based on weight of total composition, of antimony or arsenic.

9. A process according to claim 7 wherein said catalyst has incorporated therein from 0.1 to 10 weight percent, based on weight of total composition, of antimony or arsenic.

10. A process according to claim 5 wherein said catalyst comprises bismuth stanate and said support comprises alumina.

11. A process according to claim 5 wherein said catalyst has a molar ratio of tin to bismuth, cobalt or nickel in the range of 2:1 to 1:2, the carrier material comprises from 30 to 60 weight percent of total catalyst composition, and there is incorporated into said catalyst from 0 to 10 weight percent, based on weight of total composition, of a Group IA or Group IIA metal and from 0 to 10 weight percent, based on weight of total composition, of antimony or arsenic.

12. A process according to claim 11 wherein said feedstock comprises butane.

References Cited

UNITED STATES PATENTS

| | | | |
|---|---|---|---|
| 3,374,284 | 3/1968 | Barclay et al. | 260—680 |
| 3,380,931 | 4/1968 | Ryland | 260—680 X |
| 3,501,547 | 3/1970 | Nolan et al. | 260—680 |
| 3,555,105 | 1/1971 | Nolan et al. | 260—680 |
| 3,207,807 | 9/1965 | Bajars et al. | 260—680 |
| 3,207,810 | 9/1965 | Bajars | 260—680 |
| 3,308,183 | 3/1967 | Bajars | 260—680 |

PAUL M. COUGHLAN, JR., Primary Examiner

U.S. Cl. X.R.

252—464, 466 R; 260—683.3